US008165376B2

(12) United States Patent
Shen et al.

(10) Patent No.: US 8,165,376 B2
(45) Date of Patent: Apr. 24, 2012

(54) SYSTEM AND METHOD FOR AUTOMATIC DETECTION OF RIB METASTASIS IN COMPUTED TOMOGRAPHY VOLUME

(75) Inventors: Hong Shen, Plainsboro, NJ (US); Limin Ma, Lowell, MA (US)

(73) Assignee: Siemens Corporation, Iselin, NJ (US)

( * ) Notice: Subject to any disclaimer, the term of this patent is extended or adjusted under 35 U.S.C. 154(b) by 1173 days.

(21) Appl. No.: 11/951,382

(22) Filed: Dec. 6, 2007

(65) Prior Publication Data
US 2008/0137932 A1    Jun. 12, 2008

Related U.S. Application Data

(60) Provisional application No. 60/869,354, filed on Dec. 11, 2006.

(51) Int. Cl.
G06K 9/00    (2006.01)
G06K 9/34    (2006.01)
(52) U.S. Cl. .................... 382/131; 382/129; 382/130
(58) Field of Classification Search .................. 382/130, 382/131, 169, 199, 203, 173, 108, 133, 134, 382/129; 378/37; 600/532, 516, 594
See application file for complete search history.

(56) References Cited

U.S. PATENT DOCUMENTS

| 6,266,453 B1 * | 7/2001 | Hibbard et al. ............... 382/294 |
| 6,577,752 B2 * | 6/2003 | Armato et al. ................ 382/131 |
| 7,492,968 B2 * | 2/2009 | Jerebko et al. ................ 382/300 |
| 2002/0168110 A1 * | 11/2002 | Al-Kofahi et al. ............ 382/199 |
| 2003/0086599 A1 * | 5/2003 | Armato, III et al. ........... 382/131 |
| 2003/0212327 A1 * | 11/2003 | Wang et al. .................... 600/437 |
| 2003/0215119 A1 * | 11/2003 | Uppaluri et al. .............. 382/128 |
| 2005/0010107 A1 | 1/2005 | Shen |
| 2005/0265606 A1 * | 12/2005 | Nakamura ...................... 382/218 |
| 2006/0062425 A1 | 3/2006 | Shen et al. |
| 2006/0173271 A1 | 8/2006 | Shen et al. |
| 2006/0173272 A1 | 8/2006 | Qing et al. |
| 2007/0086640 A1 * | 4/2007 | Luo et al. ....................... 382/132 |
| 2007/0249910 A1 | 10/2007 | Kiraly et al. |

OTHER PUBLICATIONS

Delmeshki et al "Shape Based Region Growing using derivatives of 3D medical images : Application to automatic detection of pulmonary nodules"; Proceesings of the 3rd international symposium on Image and signal processing and Analysis; 2003.*
Shen, Hong, "Tracing Based Segmentation for the Labeling of Individual Rib Structures in Chest CT Volume Data," *Proc. of the 7th Int'l Conf. MICCAI*, (2004) France.
Shen, Hong, et al. "A System for Automatic Rib Labeling in Chest CT Volume Data," *Conf. of Radiological Society of North Americal*, (2004) Chicago Ill.

* cited by examiner

*Primary Examiner* — Vikkram Bali
*Assistant Examiner* — Nancy Bitar

(57) ABSTRACT

A method and system for automatically detecting rib metastasis in a thoracic CT volume is disclosed. The ribs are segmented in said CT volume by recursive tracing. A series of cross-sectional images are then generated along a centerline of each rib. Cortical and trabecular bone structures are segmented in each of the cross-sectional images for each rib. Features are calculated for each cross-sectional image based on characteristics of the cortical and trabecular bone structures, and alterations are detected in the cross-sectional images based on the features. Rib metastasis is detected in a rib when an alteration is detected in a number of consecutive cross-sectional images along the centerline of the rib.

24 Claims, 8 Drawing Sheets

SYSTEM AND METHOD FOR AUTOMATIC DETECTION OF RIB METASTASIS IN COMPUTED TOMOGRAPHY VOLUME

This application claims the benefit of U.S. Provisional Application No. 60/869,354, filed Dec. 11, 2006, the disclosure of which is herein incorporated by reference.

BACKGROUND OF THE INVENTION

The present invention relates to detecting rib metastasis in computed tomography (CT) volumes, and more particularly to a system and method for automatic detection of rib metastasis in CT volumes.

Computed tomography (CT) is a medical imaging method whereby digital geometry processing is used to generate a three-dimensional image of the internal features of a patient from a large series of two-dimensional X-ray images taken around a single axis of rotation. Such CT imaging results in CT volume data which is a virtual representation of internal anatomical features of a patient. The CT volume data consists of multiple slices, or two-dimensional images, that can be combined to generate a three dimensional image. CT imaging is particularly useful because it can show several types of tissue including lung, bone, soft tissue and blood vessels, with great clarity. Accordingly, such imaging of the body can be used to diagnose problems such as cancers, cardiovascular disease, infectious disease, trauma and musculoskeletal disorders.

CT imaging is commonly used to diagnose rib metastasis. Metastasis is the spread of cancer from its primary site to other places in the body. Rib metastasis is caused by cancerous cells from a primary tumor relocating to the ribs. Approximately 170,000 new cases of bone metastasis are diagnosed annually in the United States. Over 500,000 Americans live with bone metastasis. Primary carcinomas that frequently metastasize to bone include those from breast, lung, prostate, kidney, thyroid, stomach, and intestinal cancer. Accordingly, the diagnosis of bone metastasis can play a key role in cancer staging. Ribs are important sites to detect metastasis because they are more accessible to biopsy than other sites in the body, such as the lungs.

In order to diagnose rib metastasis, a doctor typically searches for rib metastasis in chest CT images generated from a CT volume data. A typical CT volume data set can contain hundreds of slices. The doctor must typically look at hundreds of such slices and on each slice study each of the rib intersections to look for possible metastasis. This diagnosis process is tedious and prone to error since the ribs typically cross through the axial slices at oblique angles. Consequently, each axial slice must be systematically evaluated by a doctor both to detect subtle abnormalities representing metastasis, and to determine which specific ribs are involved when abnormalities are detected. Accordingly, a method for automatically detecting rib metastasis is desirable.

BRIEF SUMMARY OF THE INVENTION

The present invention provides a method and system for automatically detecting rib metastasis in thoracic CT volumes. Embodiments of the present invention are capable of detecting rib metastasis by automatically detecting structural alterations in cortical and trabecular bone of each rib.

In one embodiment of the present invention, ribs are segmented in a thoracic CT volume. The ribs can be segmented using recursive tracing resulting in a centerline detected for each rib. A series of cross-sectional images are then generated along the centerline of each rib. Cortical and trabecular bone structures are segmented in each of the cross-sectional images for each rib. Rib metastasis in the ribs is detected based on features of the cortical and trabecular bone structures in the cross-sectional images.

In order to detect rib metastasis, features can be calculated for each cross-sectional image based on characteristics of the cortical and trabecular bone structures. Alterations can then be detected in the cross-sectional images based on the features. Rib metastasis can be detected in a rib when an alteration is detected in a number of consecutive cross-sectional images along the centerline of the rib.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a method for automatically detecting rib metastasis in computed tomography (CT) volumes. Embodiments of the present invention are described herein to give a visual understanding of the rib metastasis detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. For example, according to various embodiments of the present invention, electronic data representing a thoracic CT volume is manipulated within a computer system in order to detect rib metastasis in the thoracic CT volume.

According to an embodiment of the present invention, locations of rib metastasis are detected in a CT volume by alterations in bone intensities and shapes. FIG. 1 illustrates examples of rib metastasis in axial slices of CT volumes. Image (a) of FIG. 1 is an exemplary axial slice from a thoracic CT volume, in which rib metastasis 102 is shown. Images (b), (c), (d), and (e) are zoomed in views of axial slices which show examples of structural alterations 104, 106, 108, and 110 due to rib metastasis.

Figure 1A:
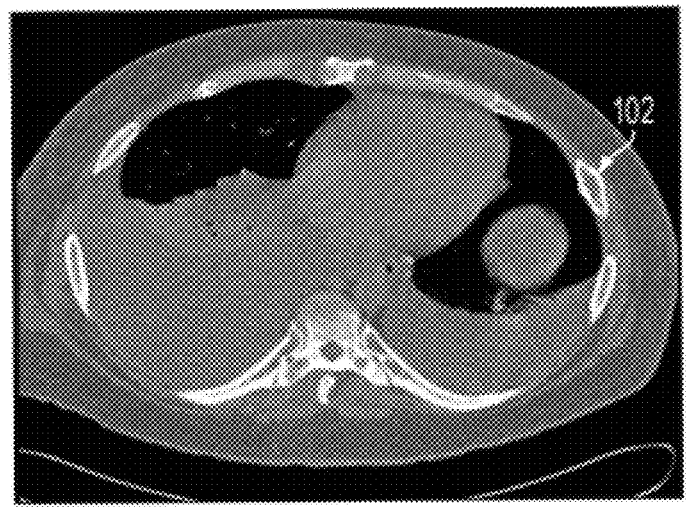
FIG. 1 illustrates examples of rib metastasis in axial slices of CT volumes.
Figure 1B:
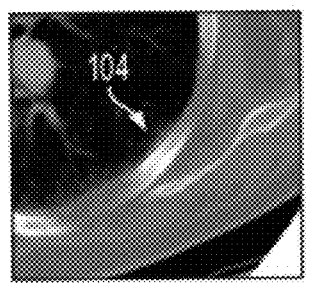
Figure 1C:
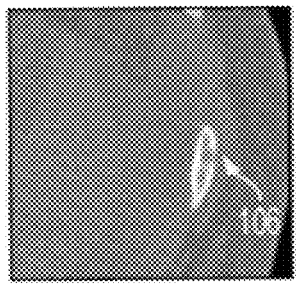
Figure 1D:
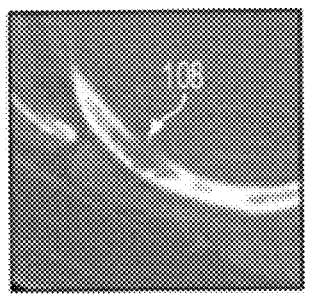
Figure 1E:
Figure 2:
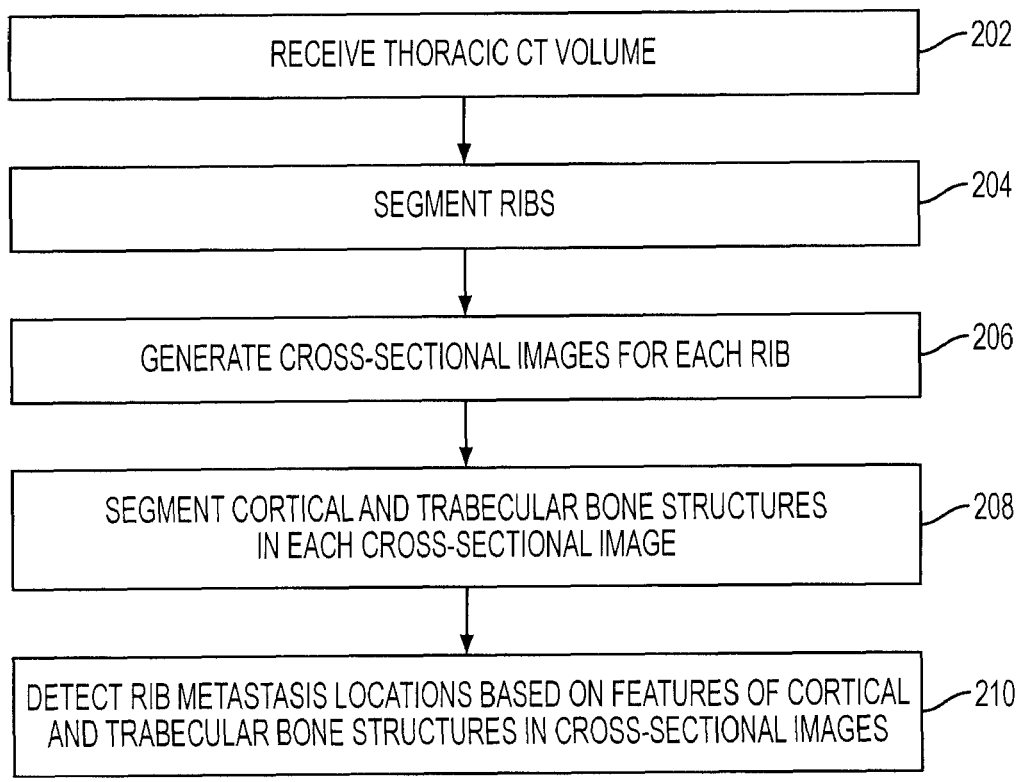
FIG. 2 illustrates a method for detecting rib metastasis in a CT volume according to an embodiment of the present invention.

FIG. 2 illustrates a method for detecting rib metastasis in a CT volume according to an embodiment of the present invention. As described above, rib metastasis manifests itself as structural alterations the rib bones. Accordingly, the method of FIG. 2 detects rib metastasis by detecting alterations in the intensity and shape of the rib bones.

At step 202, a thoracic CT volume is received. The thoracic CT volume can be received from a CT scanner which is used to acquire the thoracic CT volume by scanning a patient. The thoracic CT volume can also be received by loading or inputting a CT volume which has been previously acquired and stored, for example on storage or memory of a computer system.

Figure 3A:
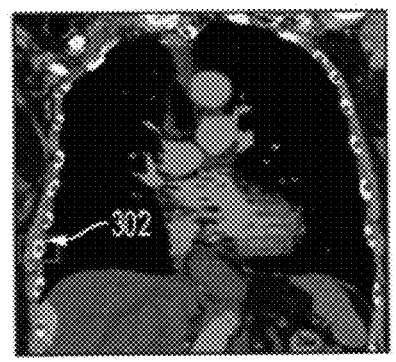
FIG. 3 illustrates segmentation of ribs using recursive tracing.
Figure 3B:
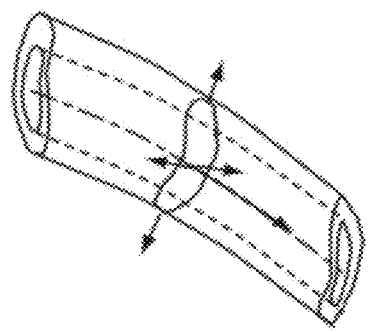
Figure 3C:
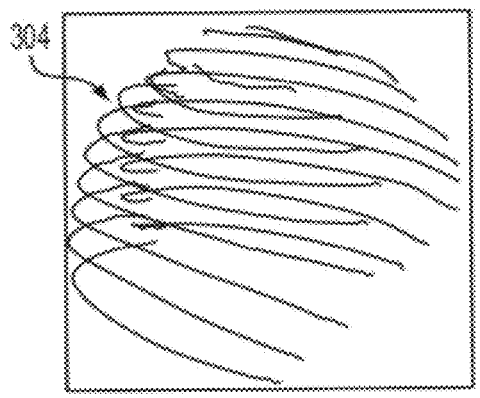

At step 204, the ribs are segmented in the thoracic CT volume. The ribs can be segmented using recursive tracing from automatically detected seed points. FIG. 3 illustrates the segmentation of the ribs using recursive tracing. In order to segment the ribs using recursive tracing, a seed point for each rib can be automatically from a coronal slice of the CT volume. Image (a) of FIG. 3 shows the automatic detection of seed points 302 in a coronal slice. In order to obtain one seed point for each rib, a sagittal slice close to the center of the chest is selected. The selected sagittal slice intersects with all of the ribs, but does not contain any point from the spine or sternum. As illustrated in image (a) of FIG. 3, on this sagittal image, the intersections of the ribs are small ellipses which line up uniformly around the border of the lungs. A bone threshold can be applied to binarize the image and label the foreground regions. Size constraints can be applied to rule out most false regions, and the centroids of the remaining regions are recorded as seed candidates. The contours of the lung boundaries are also extracted. Valid seed candidates are required to be close enough to the outer lung boundary, and uniformly distributed along the boundary. Starting from the seed point in each rib, recursive tracing is used to trace along the rib structure, as shown in image (b) of FIG. 3. Recursive tracing iteratively calculates a path of the rib structure in both directions from the seed point, and moves along the calculated path step by step in order to trace the entire rib structure. The recursive tracing of each rib results in a centerline representing a position of the rib being determined for each rib. Image (c) of FIG. 3 shows rib centerlines 304 resulting from the recursive tracing.

Returning to FIG. 2, at step 206, a series of 2D cross-sectional images are generated along the centerline of each rib. A series of cross-section planes are defined along the whole length of centerline of each rib, with each cross-section plane orthogonal the centerline. A 2D cross-sectional image is generated on each cross-section plane for each rib. Each 2D cross-sectional image is generated by interpolation in a region of interest around an intersection of the centerline and the cross-section plane. Accordingly, since each cross-section plane can intersect with the CT volume at an angle, points in the CT volume are interpolated to determine points in the cross-sectional image on each cross-section plane.

At step 208, cortical and trabecular bone structures are segmented in each of the cross-sectional images for each rib. The cortical bone is the thin outer layer that has a relatively high intensity, and the trabecular bone is the inner portion of the rib bone that has a lower intensity. These two types of bone are separately segmented from each of the cross-sectional images. The cortical and trabecular bone structures can be segmented in each of the cross-sectional images using a segmentation method that combines such techniques as adaptive thresholding, morphological operations, and anisotropic thresholding.

According to an embodiment of the present invention, an adaptive thresholding segmentation method based on local constraints in terms of shape and area priors can be used to segment the complete (cortical and trabecular) bone structures from the background of each cross-sectional image. A morphological "tophat" transform can then be used to segment cortical bone structures from the complete bone structures, since the cortical bones typically correspond to local maximum in intensity with respect to background and trabecular bone structures. The trabecular bones structures can then be obtained by subtracting cortical bone structures from complete bone structures.

The adaptive thresholding segmentation method is based on the assumption that the area and shape of a bone in consecutive cross sections along the centerline should be relatively constant or change slowly. The threshold for each cross section can be optimally computed based on local area and shape constraints. Circularity is adopted as a global shape descriptor. An objective function for the segmentation algorithm can be defined by the relative change of area and shape with respect to a previous segmentation result. The optimal threshold is determined by minimizing the objective function within a specified range. This range can be empirically determined. For example, the range can be empirically determined to be between 1100 and 1200.

Figure 4:
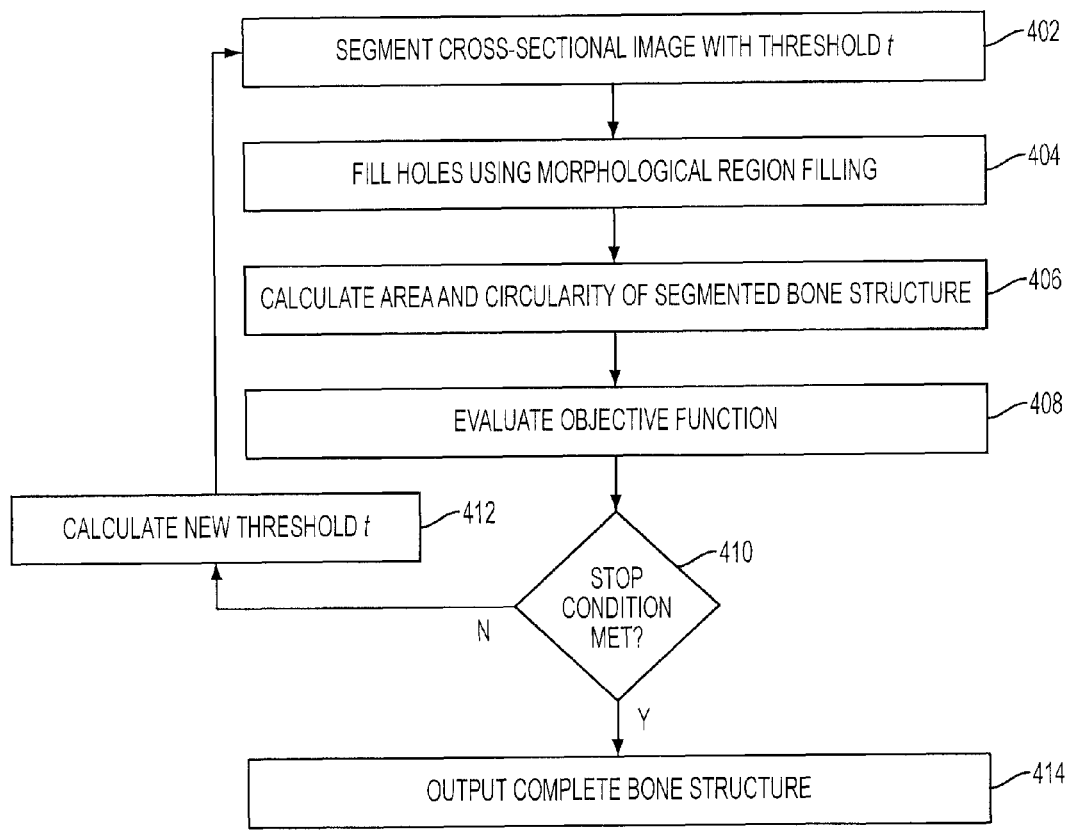
FIG. 4 illustrates an adaptive thresholding segmentation method for segmenting bone structures in a cross-sectional image according to an embodiment of the present invention.

FIG. 4 illustrates the adaptive thresholding segmentation method for segmenting the bone structures in a cross-sectional image according to an embodiment of the present invention. The method of FIG. 4 is an iterative optimization process that determines an optimal threshold and segments the image using the optimal threshold.

At step 402, the cross-sectional image is segmented with a threshold t. The first time step 402 is performed, t can be equal to an initial threshold value within the specified range of the threshold. The cross-sectional image is segmented by filtering the image using the threshold in order to generate a binary image. Accordingly, the pixel locations with intensities higher than the threshold t are labeled as foreground, while others are labels as background. The binary image represents the complete bone structures in the cross-sectional image.

At step 404, a morphological region filling is performed on the binary image resulting from step 402 in order to fill the holes in the binary image. The binary image obtained by the thresholding segmentation of step 402 may have holes inside the bone structure because the trabecular bones can have similar intensities with the background. In order to have accurate measurement of the bone structure, morphological techniques for region filling are used to fill in the holes in the bone structure. Such morphological techniques are well known.

At step 406, the area and circularity of the segmented bone structure is calculated. The area is the summation of the number of pixels in the segmented bone structure multiplied by the pixel sizes, which are computed from the image resolutions. The circularity can be calculated using a standard formula. These are parameters that reflect whether the bone region has deformed in shape or enlarged significantly, since the structure should be a compact and elliptic shape.

At step 408, the objective function is evaluated for the current segmentation results based on the area and circularity of the segmented bone structures of the current segmentation results. The objective function can be defined by the relative change of area and shape (circularity) with respect to a previous segmentation result. If the change is large in area and shape compared to the previous cross-section, a detection of alteration is temporarily recorded.

At step 410, it is determined whether a stop condition is met. For example, the stop condition can be convergence of the segmentation results or a maximum number of iterations. In order to determine convergence it can be determined whether the objective function, which represents the relative change of area and shape between the current and previous segmentation results, is less than a threshold value. If the objective function is less than the threshold value, the results have converged and a stop condition is met. If the objective function is not less than the threshold value, the results have not converged and a stop condition is not met. Similarly, if the maximum number of iterations has been reached, a stop condition is met, and if the maximum number of iterations has not been reached, the stop condition has is not met. When the stop condition is not met, the method proceeds to step 412. When the stop condition has been met, the method proceeds to step 414.

At step 412, a new threshold t is calculated based on the area and the circularity calculated for the segmented bone structures. The new threshold is determined such that the binary image created using this threshold differs minimally from the previous slice. The method then returns to step 402 and is repeated with the new threshold t.

At step 414, the segmented complete bone structure is output. As described above, the cortical bone structure can then be segmented from the complete bone structure using a morphological "tophat" transform, and the trabecular bone structure can be segmented from the complete bone structure by subtracting the cortical bone structure from the complete bone structure. The complete bone structure, cortical bone structure, and trabecular bone structure can each be stored in memory or storage of a computer system, or displayed as an image on a display of a computer system.

Figure 5:
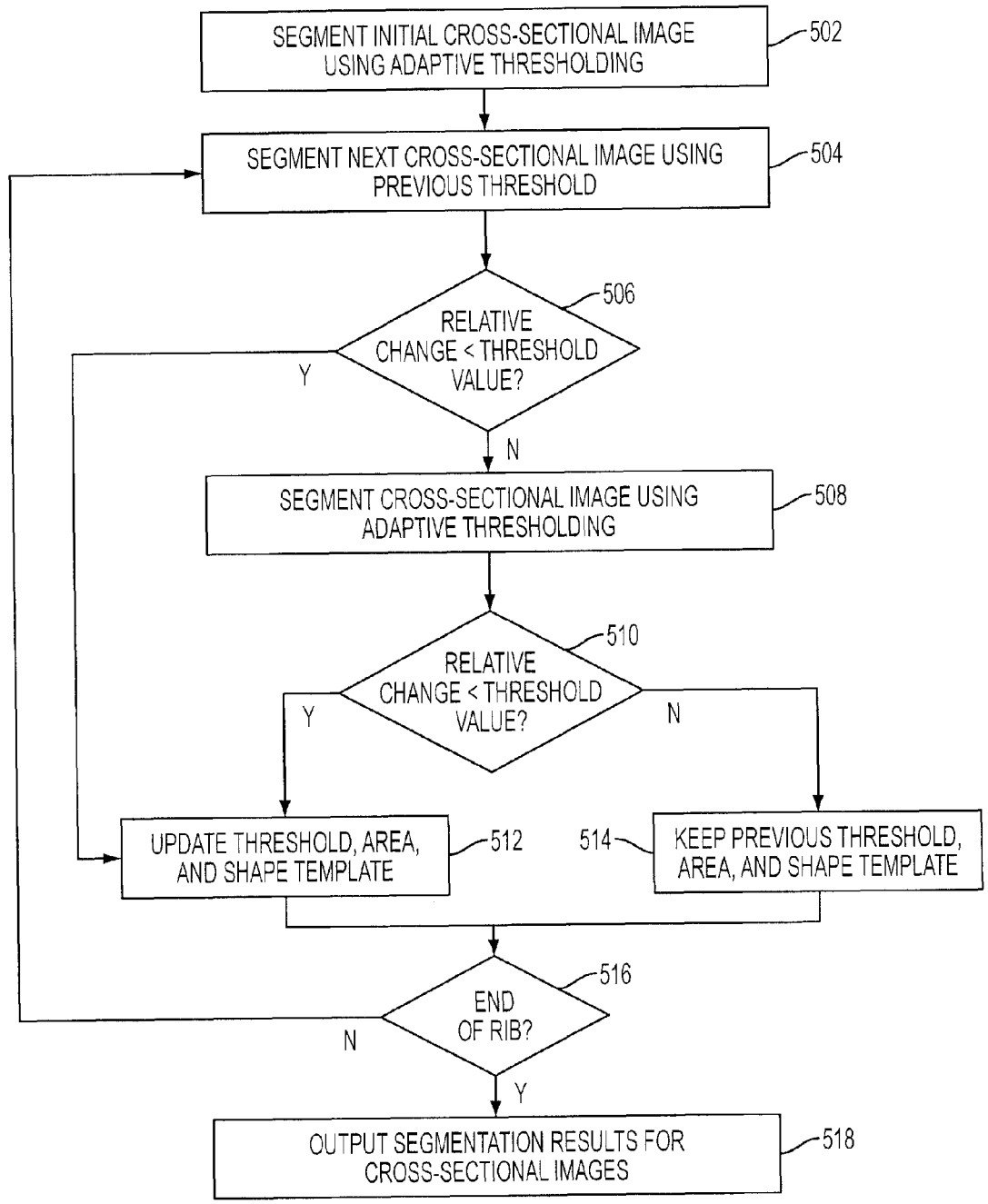
FIG. 5 illustrates a method of segmenting bone structures in a series of cross-sectional images of a rib according to an embodiment of the present invention.

As described above, FIG. 4 illustrates the segmentation of the bone structures in one cross-sectional image. FIG. 5 illustrates a method of segmenting the bone structures in all of the cross-sectional images of a rib according to an embodiment of the present invention. Accordingly, FIG. 5 together with FIG. 4 described an implementation of step 208 of FIG. 2 according to an embodiment of the present invention.

Referring to FIG. 5, at step 502, the bone structures are segmented in an initial cross-sectional image. The initial cross-sectional image is segmented using the adaptive thresholding segmentation method of FIG. 4. The initial cross-sectional image can be a cross-sectional image in the middle of the rib along the centerline, since the cross-sectional images may be better in terms of contrast and view point in the middle of the rib compared with those near the ends of the rib. Starting with an initial cross-sectional image in the middle of the rib, the segmentation can be applied sequentially to each cross-sectional image in both directions along the centerline of the rib until the ends of the rib are reached.

At step 504, a next cross-sectional image is segmented using the threshold used to segment the previous cross-sectional image.

At step 506, relative change in area and shape (circularity) of the segmented bone structure as compared with the previous cross-sectional image is calculated, and it is determined whether the relative change is less than a threshold value. For example it can be determined if the relative change is less than a threshold value of 10%. If the relative change is less than the threshold value, the segmentation is complete for the cross-sectional image and the method proceed to step 512. If the relative change is not less than the threshold value, the method proceeds to step 508

At step 508, the bone structures are segmented in the cross-sectional image using the adaptive thresholding segmentation method of FIG. 4. Since the segmentation using the threshold for the previous cross-sectional image resulted in too large of a relative change in area and shape compared to the previous cross-sectional image, adaptive thresholding is used to determine an optimal threshold for the segmentation of the cross-sectional image, as illustrated in FIG. 4.

At step 510, the relative change in area and shape of the segmented bone structure segmented in step 508 as compared with the previous cross-sectional image is calculated, and it is determine whether the relative change is less than the threshold value. If the relative change is less than the threshold value, the segmentation for the cross-sectional image is complete and the method proceeds to step 512. If the relative change is not lees than the threshold value, the method proceeds to step 514.

At step 512, when the relative change of the area and shape of the segmented bone structure in a cross-sectional image as compared with the previous cross-sectional image is less than the threshold value, the threshold, area and shape template are updated using the threshold, area, and shape of the cross-sectional image. Accordingly, the value of the threshold for the cross-sectional image is stored and used as the initial threshold for segmenting the next cross-sectional image. Similarly, the area and shape of the segmentation results for the cross-sectional image is used as a basis for comparison for the segmentation results of the next cross-sectional image.

When the relative change for a cross-sectional image is still greater than the threshold after the adaptive thresholding segmentation (step 408) is performed, an abnormality can exist in the cross-sectional image. Accordingly, at step 514, the threshold, area, and shape template from the previous cross-sectional image is kept, and not updated using the threshold, area and shape of the cross-sectional image. Thus, the threshold of the previous cross-sectional will still be used as an initial threshold for the segmentation of the next cross-sectional image, and the shape and area of the segmentation results of the previous cross-sectional image will still be used as a basis for comparison for the segmentation results of the next cross-sectional image.

At step 516, it is determined whether an end of the rib has been reached. Is an end of the rib has not been reached, the method returns to step 402 to segment the next cross-sectional image. If an end of the rib has been reached, the method proceeds to step 518. At step 518, the segmentation results for the cross-sectional images of the rib are output. For example, the segmentation results can be stored in memory or storage of a computer system or displayed images on a display device. Once the complete bone structures are segmented in each cross-sectional image, the cortical bones structures can be segmented in each cross-sectional image using a morphological "tophat" transform, and the trabecular bone structures can be segmented in each cross-sectional image by subtracting the cortical bones structures from the complete bone structures.

FIGS. 4 and 5 provide possible implementations of step 208 of FIG. 2, but the present invention is not limited thereto. It is possible that other segmentation methods may be used instead of or in addition to the methods of FIGS. 4 and 5 to segment the bone structures in the cross-sectional images. For example, a marker controlled watershed segmentation method can be adapted for the detection of bone structures with connected disturbing structures. Multiple bone structures often exist in the same cross section plane near the end of ribs. Furthermore, the multiple bone structures are connected to each other, making it difficult to segment the true bone structures. Incorrect segmentations will cause inaccurate morphological measurement. The watershed method is effective for separating touching objects. In order to reduce over-segmentation, which is a common problem for standard watershed segmentation, a region marker can be generated to indicate catchment basin for each object. The watershed marker is regional minima inside an object, which suppresses all minima in the object whose depth is less than a threshold. The watershed marker can be automatically generated by performing a series of morphological operations, e.g. tophat, bottomhat, addition, subtraction, Gaussian filtering, and regional minima labeling. By superimposing the watershed marker on the original image, the catchment basin becomes flat so over-segmentation can be avoided to some extent. In practice, over-segmentation cannot be completely avoided. Therefore, a moving average bounding box for complete bone structures are computed based on local history and used to merge adjacent labels in case the bone structure has more than one label responses. This marker controlled watershed segmentation method can be activated near the end of ribs simultaneously with the adaptive thresholding method described above, such as for the last 20 cross sections at an end of the rib. The better of the two outputs can then be kept as the final segmentation for such cross-sectional images.

Returning to FIG. 2, at step 210, locations of metastasis are detected in the ribs based on features of the cortical and trabecular bone structures in the cross-sectional images of the ribs. In order to detect rib metastasis, various features of the cortical and trabecular bone structures are calculated based on characteristics of the cortical and trabecular bone structures. For example, features can be calculated based on intensity, appearance, geometric properties, etc., of the cortical and trabecular bone structures. The features are used to evaluate the segmented bone structures in the cross-sectional images to detect alterations in the bone structures. In order to distinguish noise from true pathological alterations, the features calculated for cross-sectional images along a short length of the centerline of a rib are jointly evaluated. If an alteration is consistently detected in the bone structures of a number of cross-sectional images, a rib metastasis is detected at that location of the rib. The detected locations of rib metastasis can be stored in a memory or storage of a computer system. The detected locations can also be displayed by displaying a CT images marked with an indicator at the detected rib metastasis locations.

Rib metastasis can be categorized as either lytic or sclerotic based on whether the bone density is significantly increased or decreased compared to normal. The boundary of the bones can be intact or disrupted. The combination of these possibilities leads to a variety of intensity and shape alterations of the cortical and trabecular bone structures that can be detected in each cross-sectional image. A set of rules can be used to determine whether features of the cortical and trabecular bone structures in a cross-sectional indicate that an alteration exists in the cross-sectional image. Five exemplary categories of alterations (Type A-Type E) are identified below.

Type A alterations are detected when the intensity of trabecular bones in a cross-sectional image is significantly increased with respect to normal values, such that the trabecular bones become as bright as the cortical bones. In this case, it can appear in a cross-sectional image that cortical bones exist where trabecular bones should be. Type B alterations are detected when intensity is decreased in both cortical and trabecular bone structures in a cross-sectional image with respect to normal values. This can cause the complete bone structure to change to an irregular shape, as well as decrease the bone area. Type C alterations are detected when the size of the cortical bone structure and the complete bone structure are increased in a cross-sectional image. However, Type C alterations cause area change with respect to the cortical bone structures but not the global shape. Type D alterations are detected when the cortical bone structure in a cross-sectional image is broken at multiple places. Type D alterations satisfy the following constraints: (1) the number of cortical bone regions is greater than or equal to 3; (2) cortical bones are broken apart, i.e., there is no change with respect to a region fill operation; and (3) there is a large change of moment-based shape distortion. Type E alterations are detected when the trabecular bone structure in a cross-sectional image is divided into two parts by something as bright as the cortical bone structure. When the same type of alteration is detected in a number of consecutive cross-sectional images alone a centerline of a rib, a rib metastasis is detected at that location of the rib.

Figure 6A:
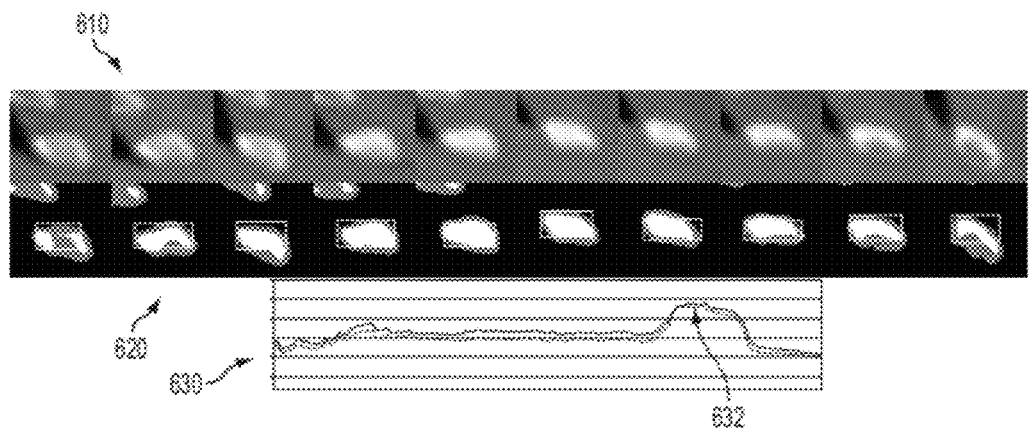
FIGS. 6A-6C illustrate exemplary results of various steps of the rib metastasis detection method of FIG. 2.
Figure 6B:
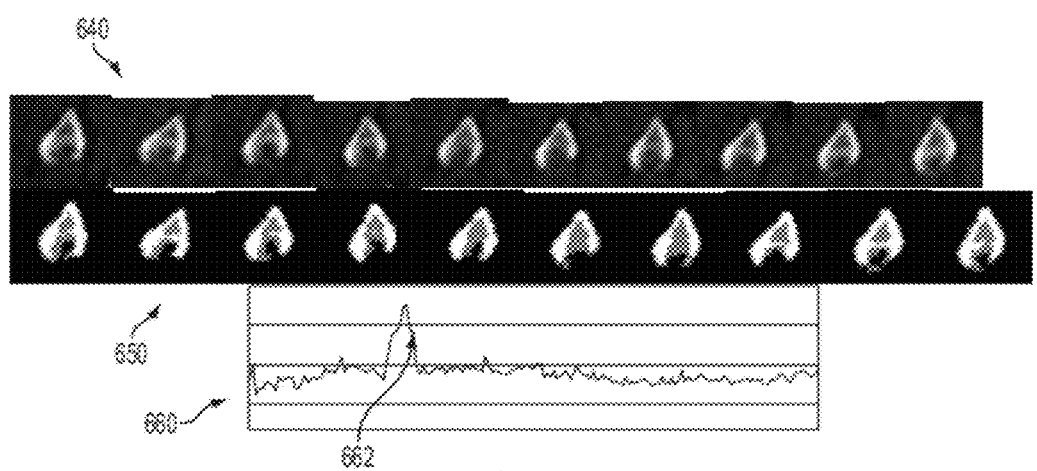
Figure 6C:
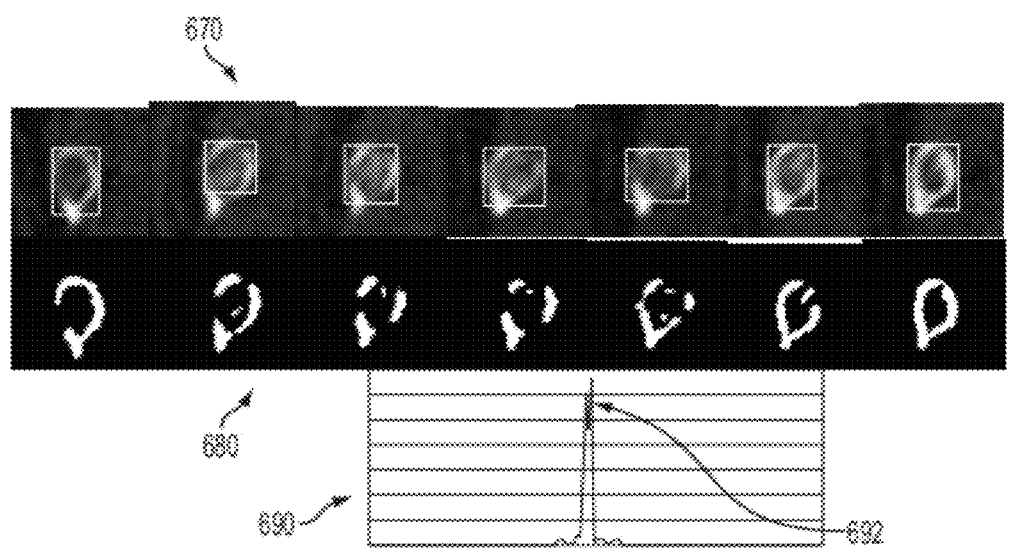

FIGS. 6A-6C illustrate exemplary results of various steps of the rib metastasis detection method of FIG. 2.

As illustrated in FIG. 6A, images 610 show exemplary 2D cross-sectional images along a length of a rib centerline (step 206). Images 620 show cortical bone structures and trabecular bone structures segmented from images 610 (step 208). As shown in images 620, the cortical bone structures are bright and the trabecular bones structures are darker. Image 630 shows feature values corresponding to the segmented cross-sectional images 620 along the length of the centerline of the rib (step 210). Peak 632 of the feature shows a significant increase in the intensity of the trabecular bone structures of consecutive cross-sectional images, and can be detected as an alteration.

As illustrated in FIG. 6B, images 640 show exemplary 2D cross-sectional images along a length of a rib centerline (step 206). Images 650 show cortical bone structures and trabecular bone structures segmented from images 640 (step 208). Image 660 shows feature values corresponding to the segmented cross-sectional images 650 along the length of the centerline of the rib (step 210). Peak 662 of the feature represents boundary breakage in the cortical bone, and can be detected as an alteration.

As illustrated in FIG. 6C, images 670 show exemplary 2D cross-sectional images along a length of a rib centerline (step 206). Images 680 show cortical bone structures segmented from images 670 (step 208). Image 690 shows feature values corresponding to the segmented cross-sectional images 670 along the length of the centerline of the rib (step 210). Peak 692 of the feature represents multiple boundary breakage in the cortical bone, and can be detected as an alteration.

Figure 7:
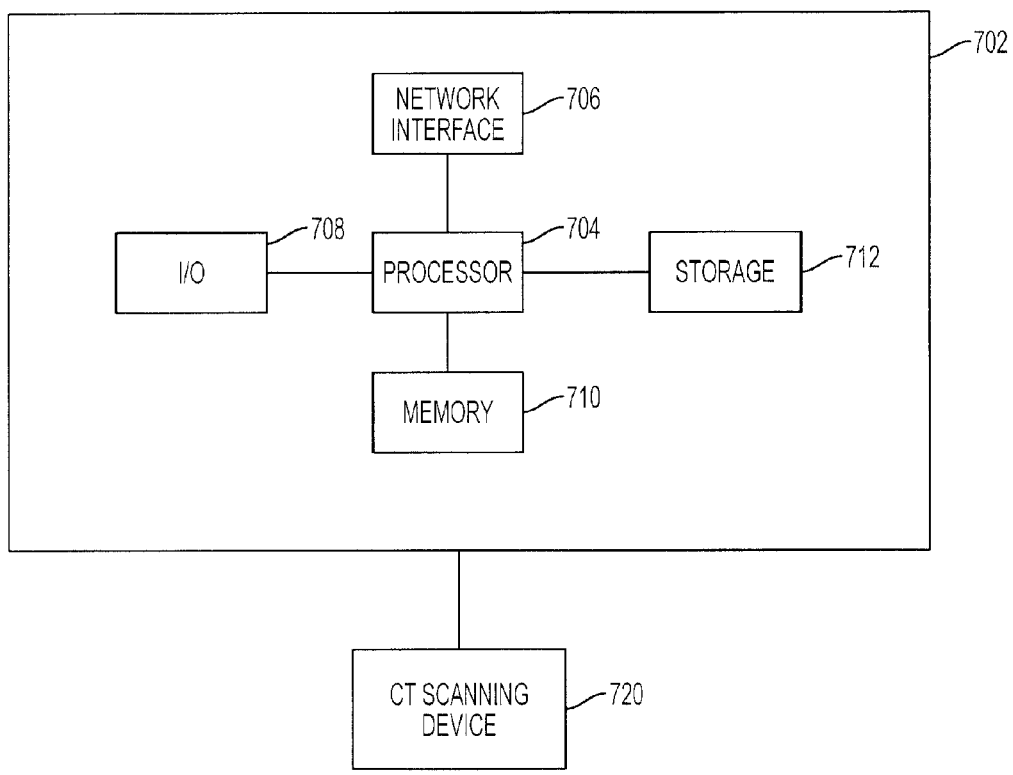
FIG. 7 is a high level block diagram of a computer capable of implementing the present invention.

The above described rib metastasis detection method can be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, applications for performing the above described method steps can be defined by the computer program instructions stored in the memory 710 and/or storage 712 and controlled by the processor 704 executing the computer program instructions. Furthermore, CT volume data corresponding to the thoracic CT volume and segmentation results can be stored in the memory 710 and/or the storage 712. A CT scanning device 720 can be connected to the computer 702 to input scanned CT volumes to the computer 702. It is possible to implement the CT scanning device 720 and the computer 702 as one device. It is also possible the CT scanning device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for rib metastasis detection in a computed tomography CT volume, comprising:
   segmenting at least one rib in said CT volume;
   generating a plurality of cross-sectional images along a centerline of said at least one rib;
   segmenting cortical and trabecular bone structures in each of said plurality of cross-sectional images; and
   detecting rib metastasis in said at least one rib based on features of said cortical and trabecular bone structures in said plurality of cross-sectional images.

2. The method of claim 1, wherein said step of segmenting at least one rib comprises:
   automatically selecting a seed point for said at least one rib;
   determining a centerline of said at least one rib using recursive tracing from said seed point.

3. The method claim 1, wherein said step of generating a plurality of cross-sectional images along a centerline of said at least one rib comprises:
   defining a plurality of planes along said centerline of said at least one rib, each of said plurality of planes orthogonal to said centerline; and
   generating a 2D cross-sectional image in each of said plurality of planes by interpolating in a region of interest around an intersection between said centerline and each of said plurality of planes.

4. The method of claim 1, wherein said step of segmenting cortical and trabecular bone structures in each of said plurality of cross-sectional images comprises:
   segmenting a complete bone structure in each of said plurality of cross-sectional images;
   segmenting said cortical bone structures from said complete bone structure in each of said plurality of cross-sectional images; and
   segmenting said trabecular bone structures in each of said plurality of cross-sectional images by subtracting said cortical bone structures from said complete bone structure.

5. The method of claim 4, wherein said step of segmenting a complete bone structure in each of said plurality of cross-sectional images comprises:
   segmenting a complete bone structure in at least one of said plurality of cross-sectional images using adaptive thresholding.

6. The method of claim 5, wherein said step of segmenting a complete bone structure in at least one of said plurality of cross-sectional images using adaptive thresholding comprises:
   (a) segmenting the complete bone structure in said at least one of said plurality of cross-sectional images using a threshold t,
   (b) filling holes in the complete bone structure segmented in step (a) using morphological region filling;
   (c) calculating an area and circularity of the complete bone structure;
   (d) evaluating an objective function based on said area and circularity of the complete bone structure;
   (e) iteratively updating the threshold t and repeating steps (a)-(e) until a stop condition has been met.

7. The method of claim 4, wherein said step of segmenting a complete bone structure in each of said plurality of cross-sectional images comprises:
   (a) segmenting the complete bone structure in an initial cross-sectional image using a threshold determined by adaptive thresholding;
   (b) segmenting the complete bone structure in a next cross-sectional image using a prior threshold used to segment the complete bone structure in a previous cross-sectional image;
   (c) determining whether the relative change between an area and a shape of the complete bone structure segmented in step (b) and a prior area and a prior shape of the complete bone structure segmented in said previous cross-sectional image is less than a threshold value;
   (d) if the relative change is less than said threshold value in step (c), updating the prior area and prior shape to be equal to the area and the shape of the complete bone structure segmented in step (b);
   (d) if the relative change is greater than said threshold value in step (c),
      (i) segmenting the complete bone structure in said next cross-sectional image using a new threshold determined by active thresholding,
      (ii) determining whether the relative change between an area and a shape of the complete bone structure segmented in step (i) and the prior area and prior shape is less than said threshold value, and
      (iii) updating the prior threshold to be equal to the new threshold, and the prior area and the prior shape to be equal to the area and the shape of the complete bone structure segmented in step (i); and
   (e) repeating steps (b)-(d) for each subsequent cross-sectional image in said plurality of cross-sectional images.

8. The method of claim 1, wherein said step of detecting rib metastasis in said at least one rib comprises:
   calculating one or more features for each of said plurality of cross-sectional images based on characteristics of said cortical bone structures and said trabecular bone structures in each of said plurality of cross-sectional images;
   detecting alterations said plurality of cross-sectional images based on said one or more features; and
   detecting rib metastasis in said at least one rib when an alteration is detected in a number of consecutive ones of said plurality of cross-sectional images along said centerline of said at least one rib.

9. The method of claim 1, further comprising:
   categorizing said rib metastasis into a plurality of types of bone structure alterations based on said features; and
   detecting each of said plurality of types of bone structure alterations separately.

10. An apparatus for rib metastasis detection in a computed tomography CT volume, comprising:
   means for segmenting at least one rib in said CT volume;
   means for generating a plurality of cross-sectional images along a centerline of said at least one rib;
   means for segmenting cortical and trabecular bone structures in each of said plurality of cross-sectional images; and
   means for detecting rib metastasis in said at least one rib based on features of said cortical and trabecular bone structures in said plurality of cross-sectional images.

11. The apparatus of claim 10, wherein said means for segmenting at least one rib comprises:
   means for automatically selecting a seed point for said at least one rib;
   means for determining a centerline of said at least one rib using recursive tracing from said seed point.

12. The apparatus claim 10, wherein said means for generating a plurality of cross-sectional images along a centerline of said at least one rib comprises:
   means for defining a plurality of planes along said centerline of said at least one rib, each of said plurality of planes orthogonal to said centerline; and
   means for generating a 2D cross-sectional image in each of said plurality of planes by interpolating in a region of interest around an intersection between said centerline and each of said plurality of planes.

13. The apparatus of claim 10, wherein said means for segmenting cortical and trabecular bone structures in each of said plurality of cross-sectional images comprises:
   means for segmenting a complete bone structure in each of said plurality of cross-sectional images;
   means for segmenting said cortical bone structures from said complete bone structure in each of said plurality of cross-sectional images; and
   means for segmenting said trabecular bone structures in each of said plurality of cross-sectional images by subtracting said cortical bone structures from said complete bone structure.

14. The apparatus of claim 13, wherein said means for segmenting a complete bone structure in each of said plurality of cross-sectional images comprises:
   means for segmenting a complete bone structure in at least one of said plurality of cross-sectional images using adaptive thresholding.

15. The apparatus of claim 10, wherein said step of detecting rib metastasis in said at least one rib comprises:
   means for calculating one or more features for each of said plurality of cross-sectional images based on characteristics of said cortical bone structures and said trabecular bone structures in each of said plurality of cross-sectional images;
   means for detecting alterations said plurality of cross-sectional images based on said one or more features; and
   means for detecting rib metastasis in said at least one rib when an alteration is detected in a number of consecutive ones of said plurality of cross-sectional images along said centerline of said at least one rib.

16. A non-transitory computer readable medium encoded with computer executable instructions for rib metastasis detection in a computed tomography CT volume, the computer executable instructions defining steps comprising:
   segmenting at least one rib in said CT volume;
   generating a plurality of cross-sectional images along a centerline of said at least one rib;
   segmenting cortical and trabecular bone structures in each of said plurality of cross-sectional images; and
   detecting rib metastasis in said at least one rib based on features of said cortical and trabecular bone structures in said plurality of cross-sectional images.

17. The non-transitory computer readable medium of claim 16, wherein the computer executable instructions defining the step of segmenting at least one rib comprise computer executable instructions defining the steps of:
   automatically selecting a seed point for said at least one rib;
   determining a centerline of said at least one rib using recursive tracing from said seed point.

18. The non-transitory computer readable medium of claim 16, wherein the computer executable instructions defining the step of generating a plurality of cross-sectional images along a centerline of said at least one rib comprise computer executable instructions defining the steps of:
   defining a plurality of planes along said centerline of said at least one rib, each of said plurality of planes orthogonal to said centerline; and
   generating a 2D cross-sectional image in each of said plurality of planes by interpolating in a region of interest around an intersection between said centerline and each of said plurality of planes.

19. The non-transitory computer readable medium of claim 16, wherein the computer executable instructions defining the step of segmenting cortical and trabecular bone structures in each of said plurality of cross-sectional images comprise computer executable instructions defining the steps of:
   segmenting a complete bone structure in each of said plurality of cross-sectional images;
   segmenting said cortical bone structures from said complete bone structure in each of said plurality of cross-sectional images; and
   segmenting said trabecular bone structures in each of said plurality of cross-sectional images by subtracting said cortical bone structures from said complete bone structure.

20. The non-transitory computer readable medium of claim 19, wherein the computer executable instructions defining the step of segmenting a complete bone structure in each of said plurality of cross-sectional images comprise computer executable instructions defining the step of:
   segmenting a complete bone structure in at least one of said plurality of cross-sectional images using adaptive thresholding.

21. The non-transitory computer readable medium of claim 20, wherein the computer executable instructions defining the step of segmenting a complete bone structure in at least one of said plurality of cross-sectional images using adaptive thresholding comprise computer executable instructions defining the steps of:
   (a) segmenting the complete bone structure in said at least one of said plurality of cross-sectional images using a threshold t,
   (b) filling holes in the complete bone structure segmented in step (a) using morphological region filling;
   (c) calculating an area and circularity of the complete bone structure;
   (d) evaluating an objective function based on said area and circularity of the complete bone structure;
   (e) iteratively updating the threshold t and repeating steps (a)-(e) until a stop condition has been met.

22. The non-transitory computer readable medium of claim 19, wherein the computer executable instructions defining the step of segmenting a complete bone structure in each of said plurality of cross-sectional images comprise computer executable instructions defining the steps of:

(a) segmenting the complete bone structure in an initial cross-sectional image using a threshold determined by adaptive thresholding;
(b) segmenting the complete bone structure in a next cross-sectional image using a prior threshold used to segment the complete bone structure in a previous cross-sectional image;
(c) determining whether the relative change between an area and a shape of the complete bone structure segmented in step (b) and a prior area and a prior shape of the complete bone structure segmented in said previous cross-sectional image is less than a threshold value;
(d) if the relative change is less than said threshold value in step (c), updating the prior area and prior shape to be equal to the area and the shape of the complete bone structure segmented in step (b);
(d) if the relative change is greater than said threshold value in step (c),
  (i) segmenting the complete bone structure in said next cross-sectional image using a new threshold determined by active thresholding,
  (ii) determining whether the relative change between an area and a shape of the complete bone structure segmented in step (i) and the prior area and prior shape is less than said threshold value, and
  (iii) updating the prior threshold to be equal to the new threshold, and the prior area and the prior shape to be equal to the area and the shape of the complete bone structure segmented in step (i); and
(e) repeating steps (b)-(d) for each subsequent cross-sectional image in said plurality of cross-sectional images.

23. The non-transitory computer readable medium of claim 16, wherein the computer executable instructions defining the step of detecting rib metastasis in said at least one rib comprise computer executable instructions defining the steps of:
  calculating one or more features for each of said plurality of cross-sectional images based on characteristics of said cortical bone structures and said trabecular bone structures in each of said plurality of cross-sectional images;
  detecting alterations said plurality of cross-sectional images based on said one or more features; and
  detecting rib metastasis in said at least one rib when an alteration is detected in a number of consecutive ones of said plurality of cross-sectional images along said centerline of said at least one rib.

24. The non-transitory computer readable medium of claim 16, further comprising computer executable instructions defining the steps of:
  categorizing said rib metastasis into a plurality of types of bone structure alterations based on said features; and
  detecting each of said plurality of types of bone structure alterations Separately.

* * * * *